(12) United States Patent
Busch et al.

(10) Patent No.: US 7,553,006 B2
(45) Date of Patent: Jun. 30, 2009

(54) INK CARTRIDGE

(76) Inventors: Peter Busch, Faunastrasse 7, 44869 Bochum (DE); Helmut Michele, Dorfstrasse 23, 44577 Castrop-Rauzel (DE)

( * ) Notice: Subject to any disclaimer, the term of this patent is extended or adjusted under 35 U.S.C. 154(b) by 550 days.

(21) Appl. No.: 11/474,350

(22) Filed: Jun. 26, 2006

(65) Prior Publication Data

US 2006/0290758 A1 Dec. 28, 2006

(30) Foreign Application Priority Data

Jun. 25, 2005 (DE) ............ 10 2005 029 588

(51) Int. Cl.
*B41J 2/175* (2006.01)
*F16K 31/08* (2006.01)

(52) U.S. Cl. .................... 347/86; 251/65
(58) Field of Classification Search ............ 347/84, 347/85, 86, 87; 251/65, 129.2
See application file for complete search history.

(56) References Cited

U.S. PATENT DOCUMENTS

| | | | |
|---|---|---|---|
| 4,966,483 A | * | 10/1990 | Hashimoto et al. .......... 401/206 |
| 5,040,002 A | | 8/1991 | Pollacek et al. |
| 5,381,956 A | * | 1/1995 | Robinson et al. ............ 239/22 |
| 6,325,354 B1 | * | 12/2001 | Hoen et al. .................... 251/65 |

FOREIGN PATENT DOCUMENTS

| | | |
|---|---|---|
| EP | 0 238 829 | 3/1991 |
| EP | 1 125 747 | 8/2001 |

* cited by examiner

*Primary Examiner*—Anh T. N. Vo
(74) *Attorney, Agent, or Firm*—Hoffman Wasson & Gitler

(57) ABSTRACT

An ink cartridge has a housing with at least one ink container having an ink outlet extending to the outside and in which a differential pressure valve is mounted. The valve has a valve opening and a valve body which can move relative to it and which (relative to the ink chamber) sits sealed on the valve opening, loaded from the outside with a predetermined closing force, and can be moved to the outside from the valve opening against the closing force. In order to form a differential pressure valve which is stable over the long term, precise, easy to produce and install, the invention proposes that a first permanent magnet is attached to the valve body and relative to the valve opening a second permanent magnet is attached securely to the ink cartridge and is opposite the first permanent magnet with the same pole, so that the repelling force between the first and second permanent magnet acts as a closing force on the valve body.

6 Claims, 1 Drawing Sheet

INK CARTRIDGE

BACKGROUND OF THE INVENTION

Ink cartridges are used as interchangeable ink tanks for ink supply of inkjet printing devices. Essentially they comprise a housing made for mechanical fixing in the corresponding receiver of a printer and one or more ink containers which can be filled with different inks housed as actual ink reservoirs. Each ink container has an ink outlet for detachable connection to the ink supply connection of the printer. If the ink contained in the ink container has been used up by the printer in operation, the empty ink cartridge can be easily taken out of the printer and replaced by a full ink cartridge. The empty ink cartridges are either thrown away or refilled with ink for re-use.

Smaller inkjet printers of simple structure require ink cartridges in which the ink at the ink outlet is at a given negative pressure level corresponding to the negative pressure produced by the print head during operation at the ink supply connection of the printer. The negative pressure level must be kept within narrow limits: On the one hand, it must be ensured that the ink does not run out by itself due to the force of gravity and disrupt the operation of the print head, on the other hand the pressure level may not be so high that ink can no longer be sucked out by the print head.

It is known to use a differential pressure valve in an ink outlet to keep the ink back in the ink cartridge under negative pressure. It opens when the print head is working and is intaking the ink, by which a negative pressure is produced on the ink supply connection. Then the differential pressure valve opens and ink can flow to the print head.

Ink cartridges with differential pressure valves in the ink outlet are known in diverse versions, for example from EP 238 829 B1. It describes a valve with an elastic valve body sealing the ink outlet channel on the outside and clears it when a predetermined negative pressure level at the ink outlet is not reached by the print head. The use of an elastic valve body does have the advantage of a simple structure. But the disadvantage is that production of an elastic valve body with the required precision of elastic properties in large numbers is relatively complex. Moreover the properties of the elastic materials change with time, so that the valve becomes leaky and the pressure difference required for opening becomes too high or too low.

To some extent, the aforementioned problems can also be equalized by the valve body being loaded with a spring element. This concept is described for example in EP 1 125 747 A2. The use of a metal spring (as shown in FIG. 8) does have the advantage of improved long term stability. In any case, springs with the required precision are complex to produce and are accordingly expensive. Moreover spring installation is complex.

In view of the aforementioned problem in the prior art, the object of the invention is to devise an ink cartridge with a differential pressure valve which is stable over the long term, precise, and easy to produce and install.

To achieve this object, it is proposed as claimed in the invention that a first permanent magnet is attached to the valve body and relative to the valve opening a second permanent magnet is attached securely to the ink cartridge and is opposite the first permanent magnet with the same pole, so that the repelling force between the first and second permanent magnet acts as a closing force on the valve body.

SUMMARY OF THE INVENTION

This invention relates to an ink cartridge having a housing with at least one ink container having an ink outlet extending to the outside and in which a differential pressure valve is mounted. The valve has a valve opening and a valve body which can move relative to it and which (relative to the ink chamber) sits sealed on the valve opening, loaded from the outside with a predetermined closing force and, when there is a pressure difference between the ink chamber and the output side of the ink outlet, can be moved to the outside from the valve opening against the closing force.

In the invention the valve force with which the valve body is pressed against the valve opening is produced, not as in the prior art by the elastic properties of the valve body or by an additional mechanical spring element, but by magnetic repulsion. The repelling force is implemented in that the first and second magnet elements are attached to the movable valve body and to the abutment which is stationary relative to the valve opening. The magnet elements are opposite one another with the same magnet poles, therefore north-north or south-south, by which a magnetic force acts which is directed to the outside with respect to a connecting line of the two magnets, in other words, presses the magnets apart from one another. In the arrangement as claimed in the invention, the movable valve body with the first magnet attached thereto is consequently pressed sealed against the valve opening by the repelling magnetic field of the second magnet attached to the fixed abutment on the ink cartridge.

Special advantages of the invention originate from the transmission of the closing force to the valve body taking place without contact. Specifically this makes it possible to produce the valve body with the first magnet and the housing with the second magnet individually at first and then to assemble them without a mechanical connection and thus especially easily into a differential pressure valve. Moreover, other potential mechanical problems resulting from the use of conventional springs, for example friction, skewing, contaminants, etc. are eliminated.

Another advantage is that permanent magnets can be favorably produced in large numbers with narrow tolerances with respect to their magnetic and mechanical properties, for example by sintering processes. In this way the response behavior of the differential pressure valve as claimed in the invention can be dictated in a correspondingly accurate manner. Furthermore, it is especially advantageous to the response characteristics of the valve for the repelling magnetic force between the two permanent magnets to be used. When the valve opens specifically the distance between the magnets is reduced, the magnet force acting on the valve body rising progressively. This ensures that the valve on the one hand reliably opens when a given pressure difference is reached, and on the other hand closes again as soon as the pressure difference decreases. This reliable function would be critical if the valve body were held in the valve seat by the magnet force of attraction, because a relatively high holding force of the valve body would have to be overcome by the magnet force which decreases progressively with increasing distance, and the reset force required for closing on the valve body is less. In this way, such an arrangement for this application would have a less favorable response characteristic.

Another favorable property of the use of the repelling magnet force as claimed in the invention is that tolerances in the distance between the permanent magnets simply have a small effect on the effective repelling magnet force. In contrast, the use of the magnet force of attraction would be likewise less favorable due to the strong dependency of the magnet force on distance at the required short distances.

By using permanent magnets of hard magnetic materials with high remanence and permeability, magnets with small dimensions can be used which maintain their magnetization over a long time. Accordingly, the closing force remains constant and valve operation is also ensured over the long term.

Preferably the pole axes of the permanent magnets are coaxially aligned. For this reason, the first and second permanent magnets are axially opposite one another with the same magnet poles with respect to the connecting line, the radial orientation being without influence. This simplifies production and no unwanted torques act on the magnets.

It is advantageous for the permanent magnets to be made disk-shaped. For the magnetic properties it is advantageous for the magnets to be shaped as cylindrical disks with an axial direction of magnetization. They are easily located axially on top of one another on the valve body and the fixed abutment in the housing of the ink cartridge. Alternatively, the permanent magnets can be made cuboidal or annular—or also in different dimensions—in order to optimize the closing force or to adapt to the housing, for example to simplify installation.

One advantageous version of the invention calls for the valve body and/or the first permanent magnet attached to it to be guided on a guide in the direction of motion. Mechanical guidance of the valve body can be formed for example by guide rods or rails and the corresponding openings in the valve body and in the housing. This results in that the valve body sits securely and exactly on the valve opening.

Another possibility for accurately positioning the valve body relative to the valve opening is for the first and second permanent magnet to form a self-centering magnet bearing. Such a magnet bearing can be formed for example by one of the permanent magnets being an axially magnetized ring which radially fixes the second magnet. In this way, contactless centering of the valve body relative to the valve opening can be accomplished.

The permanent magnets are more advantageously jacketed with plastic. In this way the magnets do not come into contact with the ink and are thus reliably protected against corrosion. Preferably the first magnet is injected at the same time into the valve body which is made as a plastic injection molded part and the second magnet is injected into the likewise plastic housing of the ink cartridge.

The ink cartridge can have one or more ink containers. The ink containers can be made as chambers within the housing or as a separate bag or the like inserted into the housing. Each individual one of these ink, containers can be provided with a differential pressure valve as claimed in the invention.

BRIEF DESCRIPTION OF THE DRAWINGS

One version of the invention is detailed below using drawings.

DETAILED DESCRIPTION OF THE INVENTION

Figure 1:
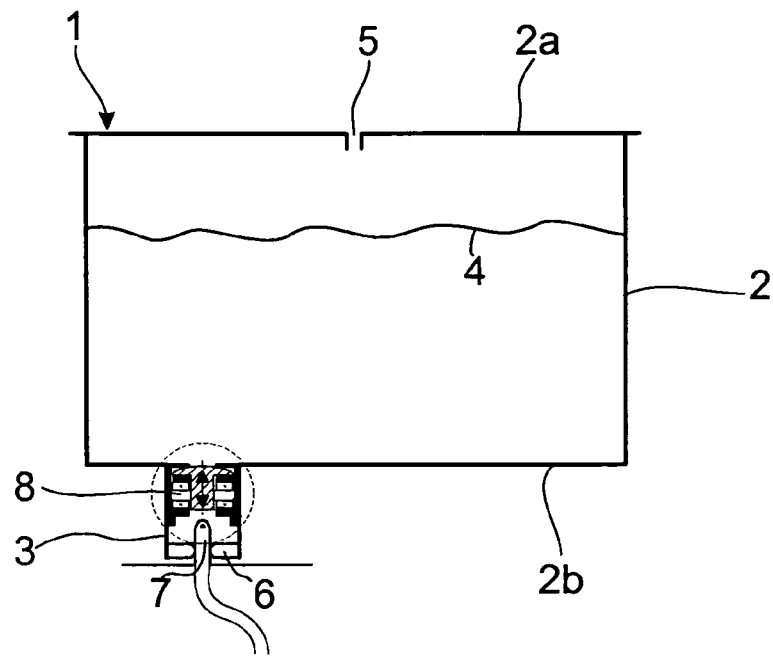
FIG. 1 shows a sectional view of an ink cartridge.

The ink cartridge 1 has an essentially box-shaped housing 2 sealed at the top with a cover 2a. From the bottom 2b of the housing 2 there extends a tubular ink outlet 3 forming a passage from the interior to the outside. The ink cartridge 1 is filled with free flowing ink up to the fill level 4 which is drawn as a wavy line.

In the cover 2a there is a ventilation opening 5 connecting the ink-filled interior of the housing 2 to the vicinity and provides for the ambient air to flow after into the housing 2 when ink is removed through the ink outlet 3.

At the output of the ink outlet 3, a sealing element 6 is inserted, through which a hollow ink removal needle 7 for ink supply of an inkjet printer, which is not individually shown, is inserted into the interior of the ink outlet 3. The sealing element 6 can be, for example, a gasket or a pierceable septum.

Figure 2:
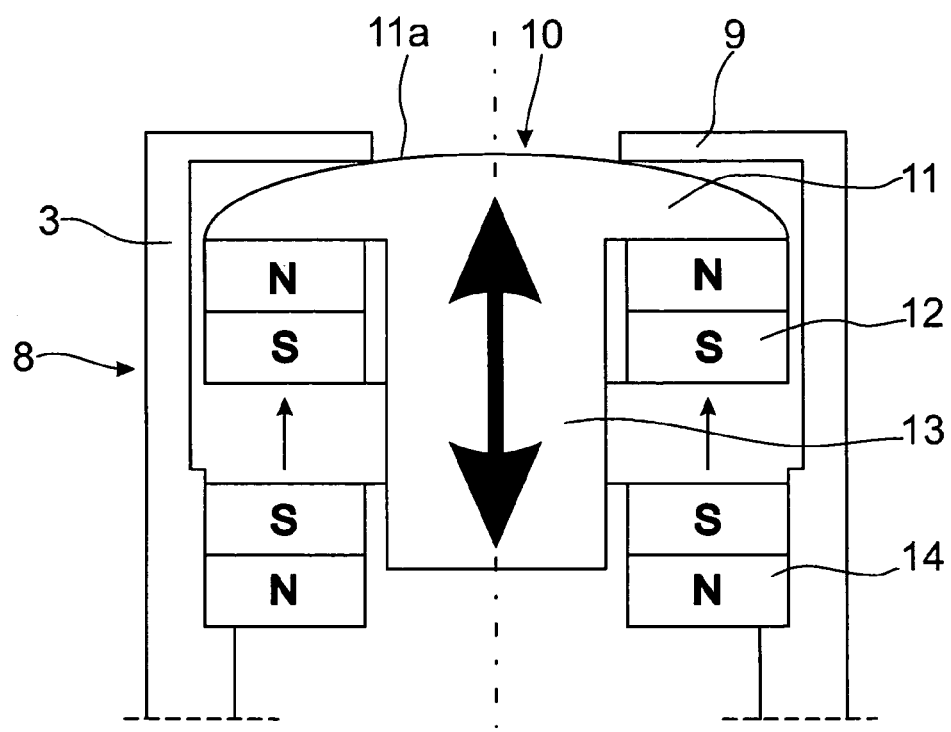
FIG. 2 shows a detailed view of the valve of the ink cartridge as shown in FIG. 1.

In the passage of the ink outlet 3 there is a differential pressure valve 8. The area drawn with the broken line with this valve 8 is shown enlarged for better explanation in FIG. 2. On the input side, which is at the top in the drawings, the ink outlet 3 has a valve seat with a valve opening 10.

On the output side of the valve opening 10 there is a valve body 11 supported to move lengthwise in the ink outlet 3; this is indicated by the double arrow. On the input side this valve body 11 has a sealing surface 11a which, in the illustrated embodiment, is made crowned-convex. This lens shape ensures sufficient sealing even with tilting relative to the valve seat 9. The sealing surface 11a can be selectively pressed sealed against the valve opening 10 or lifted for opening due to the axial mobility. On the output side a permanent magnet 12 is attached to the valve body 11 and is made as an axially polarized ring magnet. The magnetic polarization is indicated in the drawings by "S" (south pole) and "N" (north pole). Furthermore, the valve body 11 on the output side has an axial guide pin 13 which, among others, centers the ring magnet 12.

Coaxially to the ring magnet 12 which is supported to be able to move axially with the valve body 11 in the ink outlet 8, the second ring magnet 14 is mounted securely in the ink outlet 8. This second ring magnet 14 is likewise an axially polarized permanent magnet. Because it is located on the output side with respect to the first ring magnet 12 and because its polarization direction is the reverse of this, therefore the two ring magnets 12 and 14 are axially opposite one another with the same magnet poles (in this example "S"), the ring magnet 12 and thus the valve body 11 with its sealing surface 11a are pressed sealed against the valve opening 10 by the magnet force which consequently acts to repel. The resulting closing force, i.e. the repelling magnet force, is indicated in the drawings with the upwardly pointed arrows between the ring magnets 12 and 14.

The guide pin 13 is dimensioned such that it is axially guided with play in the through opening of the stationary ring magnet 14. This limits the tilting of the valve body 11 relative to the valve seat 9. The diameter of the guide pin 13 is dimensioned such that enough free passage cross section remains clear for flow of the ink through the ink outlet 3. Optionally the guide pin 13 can also be provided with lengthwise grooves or channels on its periphery.

In operation, the printer intakes ink with a certain negative pressure through the ink removal needle 7 which is inserted into and sealed to the sealing element 6 in the output of the ink outlet 3.

In this way, on the part of the sealing surface 11a which is bordered by the free cross section of the valve opening 10, there is a differential pressure to the interior of the housing 2 which thus produces a force (pointed down in the drawing) lifting the valve body 11 off the valve opening 10 so that at this point ink can flow through the differential pressure valve 8. When there is no longer any negative pressure at the outlet, the differential pressure also disappears. Then the valve body 11 is pressed sealed with its sealing surface 11a against the valve opening 10 by the closing force produced by the ring magnets 12 and 14 which are repelling one another.

The acting closing force is set by the magnetization, dimensioning and arrangement of the ring magnets 12 and 14 such that on the one hand the differential pressure valve 8 is sealed tight when there is a liquid column corresponding to the height of the housing 2 from the top, with the cartridge full, and on the other hand the differential pressure valve 8 opens reliably when a printer is intaking ink at the output of the ink outlet 3.

The invention claimed is:

1. An ink cartridge comprising
    a housing with at least one ink container having an ink outlet extending outside of said housing
    a differential pressure valve mounted in said ink outlet and comprising a valve opening and a valve body movable relative to said valve opening and the valve body sits sealed on the valve opening, loaded from the outside with a predetermined closing force, and can be moved to the outside from the valve opening against the closing force,
    a first permanent magnet being provided in said ink outlet being attached to the valve body, and
    a second permanent magnet attached securely to the ink outlet of the ink cartridge and being opposite the first permanent magnet with the same pole, so that a repelling force between the first and second permanent magnets acts as the closing force on the valve body.

2. The ink cartridge as claimed in claim 1, wherein the pole axes of first and second permanent magnets are coaxially aligned.

3. The ink cartridge as claimed in claim 1, wherein first and second permanent magnets are disk-shaped.

4. The ink cartridge as claimed in claim 1, wherein the valve body and the first permanent magnet attached to the valve body is guided on a guide in a direction of motion.

5. The ink cartridge as claimed in claim 1, wherein the first and second permanent magnets form a self-centering magnet bearing.

6. The ink cartridge as claimed in claim 1, wherein the first and second permanent magnets are jacketed with plastic.

* * * * *